Jan 6, 1931.   D. H. SWEET   1,787,602
SHOCK ABSORBER
Original Filed Feb. 12, 1924   4 Sheets-Sheet 1
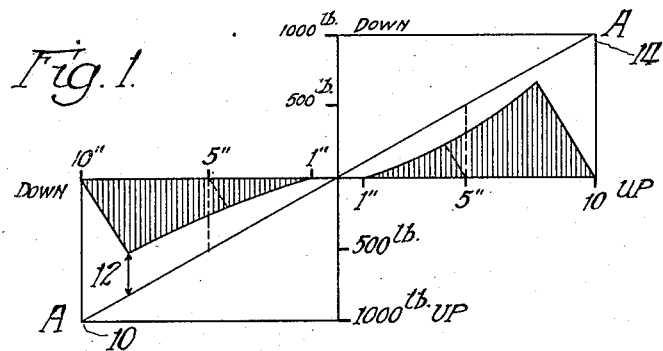
Fig. 1.
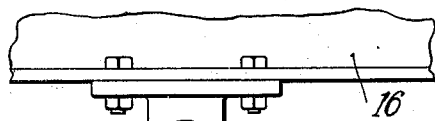
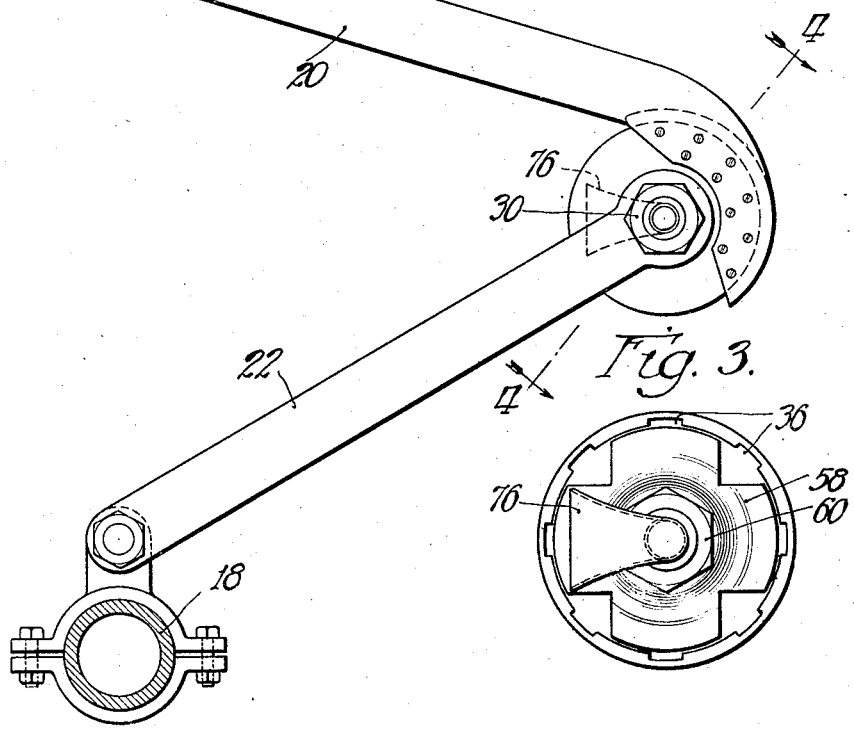
Fig. 2.
Fig. 3.
Inventor.
Donald H. Sweet

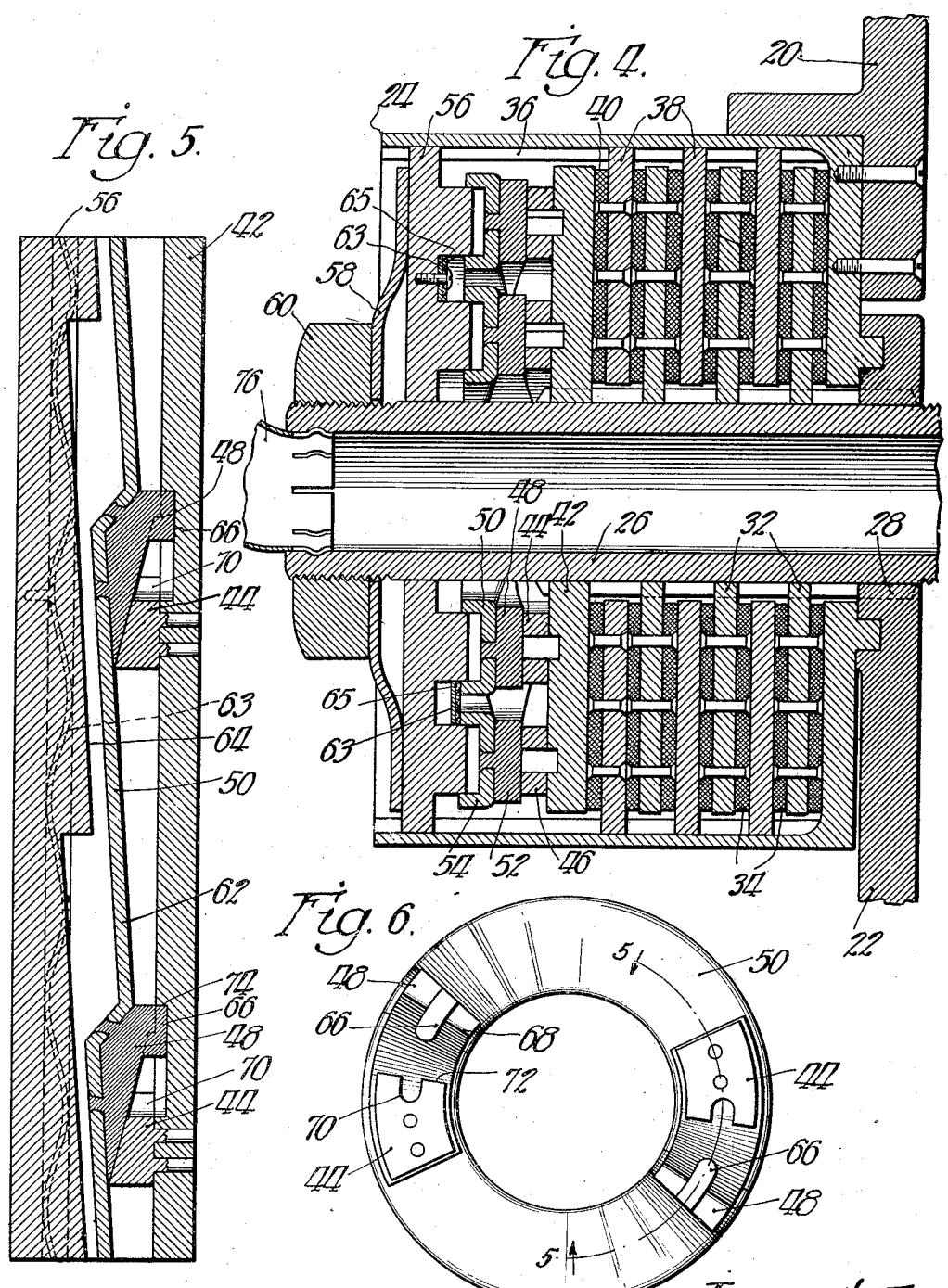

Jan 6, 1931.   D. H. SWEET   1,787,602
SHOCK ABSORBER
Original Filed Feb. 12, 1924   4 Sheets-Sheet 3

Inventor
Donald H. Sweet

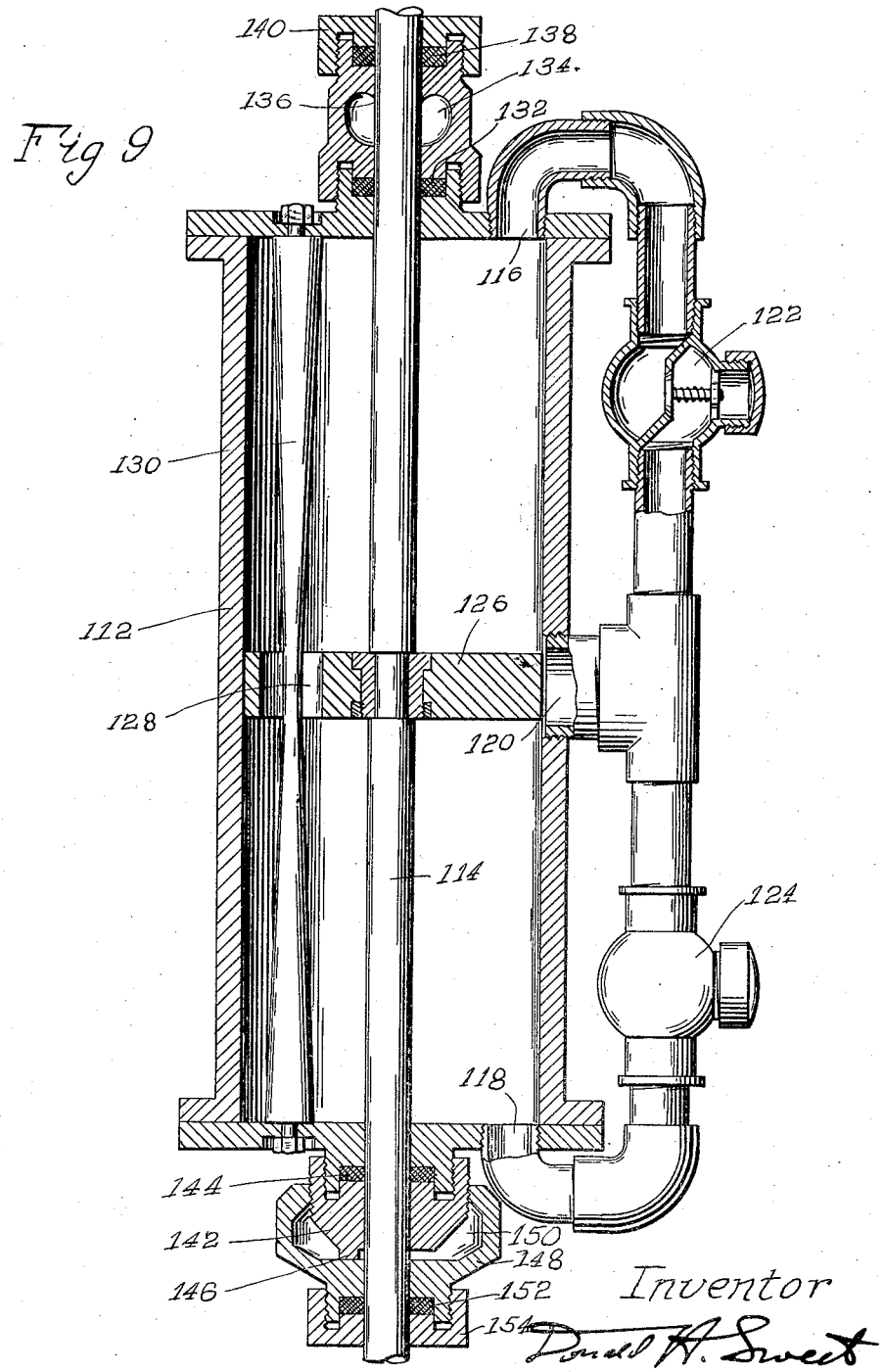

Patented Jan. 6, 1931

1,787,602

UNITED STATES PATENT OFFICE

DONALD H. SWEET, OF EVANSTON, ILLINOIS

SHOCK ABSORBER

Application filed February 12, 1924, Serial No. 692,261. Renewed January 12, 1929.

My invention relates to shock absorbers.

The conditions of movement to which the running gear and chassis of a motor vehicle are subjected in passing over an irregular road surface are peculiar, and the most effective compensation for an elimination of the shocks received from such irregularities is dynamically far from a simple problem.

Consider the hypothetical case of a car having a manually controlled means for resisting any relative movement of the running gear and chassis and operating at such speed that manual control of the absorption of each displacement is practicable.

During any departure from normal positioning, the application of the absorber would only increase the energy imparted to the chassis by the unavoidable displacement of the running gear. Therefore, during such displacement, the operator would apply no friction. During the return movement, however, the operator would apply sufficient friction to bring the chassis to rest again in precisely normal position.

Let us assume next, another step toward the actual case, that the total absorbing capacity of the device provided is insufficient to completely absorb the recoil from many of the more severe shocks encountered. In the case of a shock too great to be absorbed during the return movement, the operator would absorb all the energy he could with the means at his control. This absorption would continue if the chassis were moving downward until the downward movement stopped, and if it were moving upward, until it had to be relieved to prevent lifting the running gear off the ground. The second return movement toward normal would also be damped, and so on until equilibrium was reestablished.

While it is impossible, on account of the violence and speed of the movements, if for no other reason, to control the absorption manually, it is possible to provide automatic means for very closely approximating the performance that would result from human intelligence if it could be applied.

In the accompanying drawings:

Fig. 1 is a force diagram;

Fig. 2 is a side elevation of one type of shock absorber according to the invention;

Fig. 3 is a side elevation of the other side of the drum;

Fig. 4 is a section on line 4—4 of Fig. 2;

Fig. 5 is a developed section as on line 5—5 of Figure 6 through one set of direction and position cams;

Fig. 6 is a detail plan view of one of the rings and associated parts;

Fig. 9 is a sectional view of a compensated hydraulic absorbing means.

Figure 7:
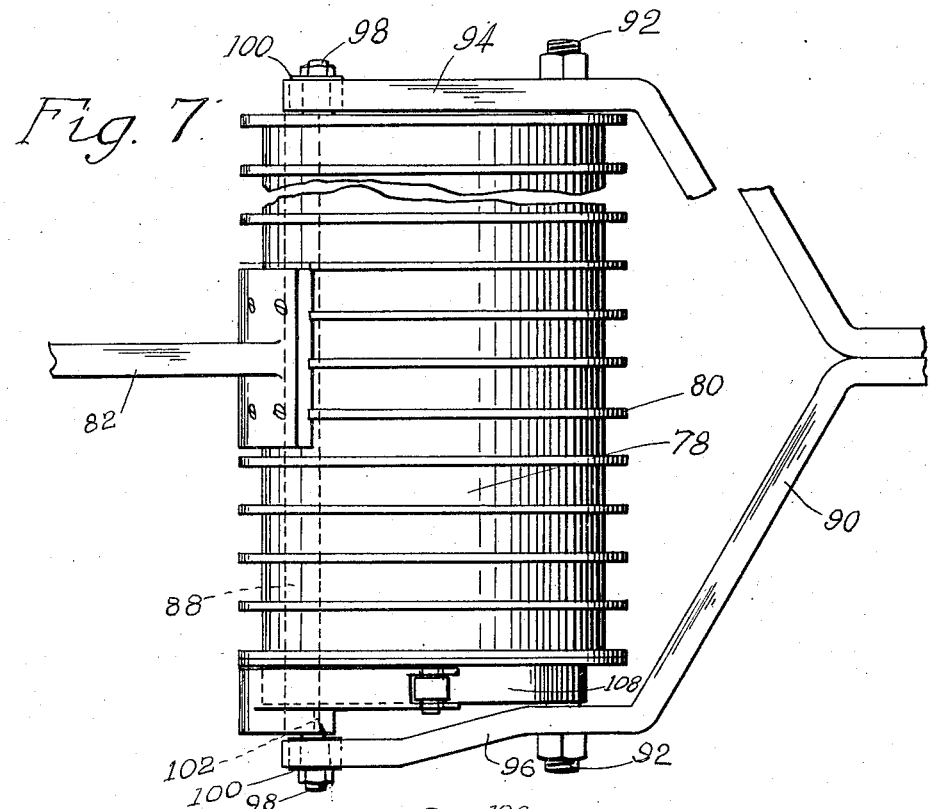
Fig. 7 is a side elevation and Fig. 8 an end view of an alternative construction.

Referring first to Fig. 1, the abscissæ represent displacement of the chassis with respect to the axle, and the ordinates represent the net unbalanced force tending to produce movement of the chassis. A—A is the force curve of the spring. The shaded areas represent the energy absorbed by the absorber shown in Figs. 2 to 6, inclusive. For instance, a sudden elevation of the axle for ten inches would carry one to point 10 at the lower left-hand corner of the diagram, with the chassis ten inches too close to the axle, and a net unbalanced restoring force of a thousand pounds (1000) tending to produce upward movement of the chassis. During this movement the shock absorber does nothing.

At the beginning of the return movement, the full unbalanced force of one thousand pounds is permitted to act for a relatively short time, to let the return movement start as soon as possible. Friction is applied in rapidly increasing amount, until the line 12 represents all of the restoring force still permitted to become effective on the chassis, the rest being absorbed by the shock absorber. During the return movement to one inch displacement, absorption continues, being always somewhat less than the total restoring force available.

If, now, the recoil carries the chassis past normal position, or if the running gear should come to a depression, the action would be the same in a reversed sense. Thus, the upward displacement to point 14 would occur without any action on the part of the shock absorber, but during the return movement, the shaded area to the right of the origin would be subtracted from the energy of recoil.

Referring now to Figs. 2 to 6, inclusive, I have indicated a body 16 and axle 18 connected through pivoted arms 20 and 22 respectively with the outer drum or casing 24 and inner pin 26 of the shock absorbing device proper. Pin 26 is splined to arm 22 at 28, and separation of the parts is prevented by retaining nut 30. The same splines receive a plurality, in this instance 3, of clutch plates 32, each clutch plate having annular facings 34 of friction material bolted on both sides thereof.

Drum 24 is suitably bolted to arm 20 and splined at 36 to receive clutch plates 38 alternated with clutch plates 32. The outer clutch plate 38 has a friction facing 40 on one side only.

Against this last friction facing bears the direction master plate 42 sliding on splines 28 and carrying two inner direction cams 44 and two outer direction cams 46. Direction cams 44 engage cooperating direction cams 48 on an inner cam ring 50, and direction cams 46 engage cooperating direction cams 52 on an outer cam ring 54.

Outside the cam rings lies the position master plate 56, splined on splines 36 and held in place with a predetermined amount of play by leaf spring 58 fastened by nut 60.

The cam rings, themselves, each have two relatively long helical cam surfaces 62 cooperating with circular ribs providing cooperating cam surfaces 64 on master plate 56. The cams on master plate 56 at all times project between the flanges of the cam rings to guide them.

On reference to Fig. 5, it will be apparent that relative movement between cam ring 50 and direction plate 42 can occur to the extent of the lost motion between them, until tongue 66 and shoulder 68 on each ring cam encounter groove 70 and shoulder 72 of the plate cam. Displacement in the opposite direction is similarly limited by the interengaging shoulders at 74 in Fig. 5.

The direction cams 44, 48 shown in Fig. 5 slope in one direction, and the position cams 62, 64 in the other. The position cams can produce a maximum displacement or axial take-up substantially twice that of the direction cams. It will be apparent that movement of part 42 upward, as seen in Fig. 5, will shift ring 50 over into contact with direction plate 56, but the limit of lost motion will then be reached, and the rest of any upward displacement of part 42 will introduce an axial clearance by reason of the relative displacement of the position cams. When part 42 returns to the position shown, and goes beyond it downward to the limit of motion, the position cams will take up the axial lost motion shown, and when part 42 starts back up, the axial displacement of the direction cams will be added to that of the position cams, spring 58 will be compressed and friction will be applied. The movement necessary to apply the maximum friction will be represented in Fig. 1 by movement from point 10 to the lower end of line 12, and the slope of the line defining the absorption area will be dependent on the pitch of the direction cams.

To make sure that the direction cams will always go their limit of motion before the rings move with respect to the plate 56, I may provide a sinusoidal leaf spring 63 with a friction facing 65 rubbing on the flanges of the rings.

During the rest of the return movement to the position shown in Fig. 5, the gradual release of spring 58 by the position cams is represented by the slightly curved lines from the top of line 12 to one inch downward displacement. In terms of torque, this line would be straight, but the changing angularity of arms 20 and 22 will render it slightly concave in terms of body displacement.

The direction cams associated with the outer ring 54 are pitched in the opposite sense from those on the inner ring, and the position cams also are reversed. Thus, the outer ring will operate to compress the clutch elements, and develop the absorption area on the right of the diagram in Fig. 1.

Consider now an initial displacement of only five inches. As indicated on the diagram, the full restoring force available will still be permitted to act at the beginning of the return movement, and the smaller absorption area will be a fairly precise replica of the larger one developed by a ten inch displacement.

To assist in dissipating the heat generated in the absorber, I may make pin 26 hollow and provide it with an air horn 76 facing forward, so that the movement of the vehicle will provide air cooling through the center of the device.

Figure 8:
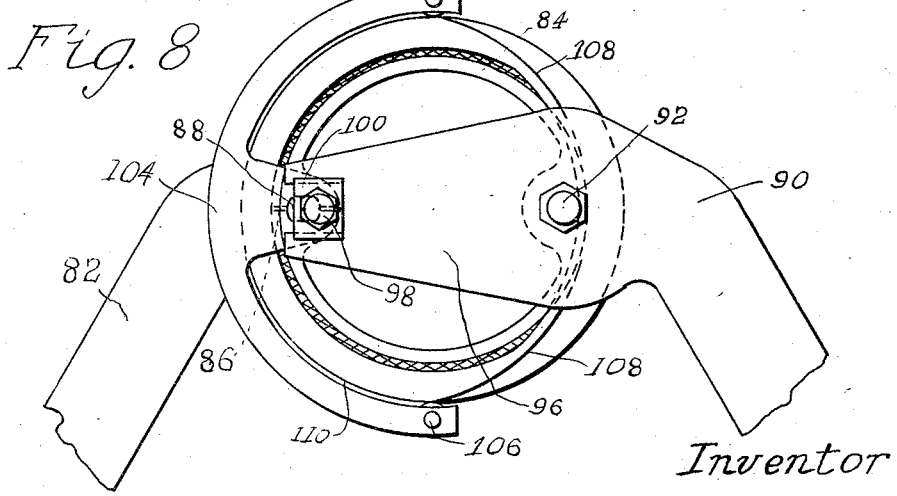

Referring now to Figs. 7 and 8, I have illustrated an outer drum 78 provided with air cooling flanges 80, and carrying an upper arm 82. The other friction element is an expanding internal brake shoe 84, split at 86 and expanded by rotation of the flattened shaft 88 in either direction. The lower arm terminates in a yoke 90, pivoted on bolt 92 projecting from shoe 84 diametrically opposite the split 86. Beyond the pivot, arms 94 and 96 extend up to the offset ends 98 of shaft 88, which ends are journaled in blocks 100 slidable in the slotted ends of the arms.

Keyed to shaft 88 at 102 is a harp 104, carrying at its opposite ends rollers 106 riding on cam surfaces 108 formed on the end of drum 78.

It will be apparent, referring to Fig. 8, that clockwise movement of yoke 90 will drag shoe 84 with it, and tend to rotate shaft 88 counter-clockwise and expand the shoe to apply friction. This action is entirely prevented by the lower roller 106 riding on the surface 110, which is concentric with the axis of the device. After any such displacement, the returning counter-clockwise movement will tend to rotate shaft 88 in the opposite direction, and the upper roller 106 will have moved down on cam surface 108 so that such movement can occur and the braking force will be applied. During the return movement, the increasing radius of the surface 108 will determine the application of friction according to any arbitrary curve desired.

Referring now to Fig. 9, cylinder 112 is connected to one of the parts having relative movement, and piston rod 114 is connected to the other. The cylinder may obviously be filled with any fluid, either liquid or gas.

Piping connects the upper port 116 and the lower port 118 with the central port 120. Check valve 122 permits flow only toward port 120 and check valve 124 also permits flow only toward the center. It will be apparent that piston 126 may be displaced in either direction and encounter substantially no resistance, but that upon any return movement toward the position shown, the entire volume between the piston and the remote end of the cylinder will be trapped and forced to leak back around the piston and through aperture 128. With aperture 128 of constant area, this system is sensitive, not to displacement, but to velocity, and unless it is so large that the chassis cannot return to normal position within a reasonable length of time, it will not develop its maximum damping effect until a relatively large proportion of the recoil movement has occurred, and an undesirably high velocity of movement has been developed.

To correct for this defect, I arrange to vary the sensitivity of the damping as a function of displacement. The means I have illustrated comprise a rod 130 of varying diameter. It will be obvious that an extreme displacement of piston 126 will move it up to a larger diameter on rod 130, decreasing the area through which the fluid can pass the piston, and increasing the forces that will be developed by a given velocity.

It will be apparent that such a system need not be limited to forces less than the net restoring force for the corresponding position at all points.

To assist in keeping the system properly filled in case a liquid is employed, I have illustrated a primary packing 132 at the top, which may be relatively loose, and a chamber 134 formed in the retaining nut for packing 132, into which chamber any liquid leaking past the packing will pass and accumulate, being scraped off the wall of rod 114 by a relatively sharp edge 136, and further confined to the chamber by a secondary packing 138, compressed by the final nut 140.

At the lower end, nut 142 compresses the primary packing 144, and has one or more bosses 146 for holding the intermediate chamber member 148 spaced from the bottom thereof. Chamber 150 is formed in member 148 so as to lie chiefly above the bottom of nut 142, so that after slight leakage has occurred, rod 114 where it issues from nut 142 will always be immersed in liquid. It only remains to provide a secondary packing 152 and nut 154 similar to those employed at the upper end.

Displacement of the chassis toward the axle, especially during a series of quick oscillations of the axle, is relatively much more dangerous than displacement away from the axle. This is because an initial position too close to the axle is apt to bring the axle and chassis into contact and break the axle, whereas the reverse action would merely lift the wheels off the ground for a relatively short space of time. It will be noted that in Fig. 1 I have shown the left-hand absorption area somewhat smaller than that on the right, and that the embodiments of the invention illustrated in Figs. 7, 8 and 9 can easily be adjusted in a similar way.

Without further elaboration, the foregoing will so fully explain the gist of my invention that others may, by applying current knowledge, readily adapt the same for use under various conditions of service, without eliminating certain features which may properly be said to constitute the essential items of novelty involved, which items are intended to be defined and secured to me by the following claims.

I claim:

1. In combination, an axle; a chassis; friction means for resisting movement between said axle and chassis; and cam control means for, firstly, rendering the friction relatively small on an excursion away from normal in either direction; secondly, for applying friction in gradually increasing amounts during the return movement up to a maximum not materially greater than the unbalanced force on the chassis at the point of maximum friction; and thirdly, for reducing the friction during the remainder of the movement to keep it less than the unbalanced force, said means including a single set of cams for performing said first and third operations.

2. In combination, an axle; a chassis; friction means for resisting movement between said axle and chassis; and cam control means for, firstly, rendering the friction relatively small on an excursion away from normal in either direction; secondly, for applying friction during a fraction of the return movement in relatively small initial amounts to permit rapid acceleration at first and increasing the friction up to a maximum not materially greater than the unbalanced force on the chassis at the point of maximum friction; and thirdly, for reducing the friction during the remainder of the return movement to keep it less than the unbalanced force; said means including a single set of cams for performing said first and third operations.

3. In combination, an axle; a chassis; friction means for resisting movement between said axle and chassis; a set of cams operative only when the chassis is above normal position for resisting downward movement; and another set of cams operative only when the chassis is below normal position for resisting upward movement, each set of cams including a position cam exerting a tendency to produce friction in amounts increasing as the displacement from normal increases, and a direction cam operated only by movement toward normal position to exert a tendency to produce friction in increasing amounts up to a predetermined limit only.

4. In combination, an axle; a chassis; friction means for resisting movement between said axle and chassis; a set of cams operative only when the chassis is above normal position for resisting downward movement; and another set of cams operative only when the chassis is below normal position for resisting upward movement, each set of cams including a position cam exerting a tendency to produce friction in amounts increasing as the displacement from normal increases, and a direction cam operated only by movement toward normal position to exert a tendency to produce friction in increasing amounts.

5. In combination, an axle; a chassis; friction means for resisting relative movement between said axle and chassis; a set of cams operative to move said friction means into engagement only on return movement toward normal from above; a set of cams operative to move said friction means into engagement only on return movement toward normal from below; and connections rendering said friction means responsive to either set of cams.

In witness whereof, I hereunto subscribe my name this 11th day of February, 1924.

DONALD H. SWEET.